(12) United States Patent
Pedersen (10) Patent No.: US 8,650,195 B2
(45) Date of Patent: Feb. 11, 2014

(54) REGION BASED INFORMATION RETRIEVAL SYSTEM

(76) Inventor: Palle M Pedersen, Brookline, MA (US)

( * ) Notice: Subject to any disclaimer, the term of this patent is extended or adjusted under 35 U.S.C. 154(b) by 54 days.

(21) Appl. No.: 13/072,647

(22) Filed: Mar. 25, 2011

(65) Prior Publication Data

US 2011/0238664 A1    Sep. 29, 2011

Related U.S. Application Data (60) Provisional application No. 61/318,272, filed on Mar. 26, 2010.

(51) Int. Cl.
*G06F 7/00* (2006.01)
*G06F 17/30* (2006.01)

(52) U.S. Cl.
CPC .................. *G06F 17/30675* (2013.01)
USPC .......................................................... 707/737

(58) Field of Classification Search
None
See application file for complete search history.

(56) References Cited

U.S. PATENT DOCUMENTS

| | | | |
|---|---|---|---|
| 5,313,616 A | 5/1994 | Cline et al. |
| 5,343,527 A | 8/1994 | Moore |
| 5,469,354 A | 11/1995 | Hatakeyama et al. |
| 5,577,249 A | 11/1996 | Califano |
| 5,745,900 A | 4/1998 | Burrows |
| 5,765,152 A | 6/1998 | Erickson |
| 5,774,883 A | 6/1998 | Andersen et al. |
| 5,892,900 A | 4/1999 | Ginter et al. |
| 5,893,095 A | 4/1999 | Jain et al. |
| 5,909,677 A | 6/1999 | Broder et al. |
| 5,917,912 A | 6/1999 | Ginter et al. |
| 5,924,090 A | 7/1999 | Krellenstein |
| 5,953,006 A | 9/1999 | Baker et al. |
| 5,958,051 A | 9/1999 | Renaud et al. |
| 6,029,002 A | 2/2000 | Afifi et al. |
| 6,035,402 A | 3/2000 | Vaeth et al. |
| 6,072,493 A | 6/2000 | Driskell et al. |
| 6,112,203 A | 8/2000 | Bharat et al. |
| 6,119,124 A | 9/2000 | Broder et al. |
| 6,138,113 A | 10/2000 | Dean et al. |
| 6,148,401 A | 11/2000 | Devanbu et al. |
| 6,189,146 B1 | 2/2001 | Misra et al. |
| 6,226,618 B1 | 5/2001 | Downs et al. |

(Continued)

FOREIGN PATENT DOCUMENTS

WO        02/27486        4/2002

OTHER PUBLICATIONS

Ganguly et al., "A new randomized algorithm for Document Fingerprinting" [online], Indian Institute of Technology, Kanpur, UP, India [retrieved on Jan. 31, 2010], retrieved from the Internet <URL: http://citeseerx.ist.psu.edu/viewdoc/download?doi=10.1.1.126.9163&rep=rep1&type=pdf>.

(Continued)

*Primary Examiner* — Jay Morrison (57) ABSTRACT

A region based information retrieval system improves on conventional information retrieval systems by breaking down documents into one or more region(s) and processing the additional information available at a region level of analysis. When looking at regions, it becomes possible to quickly distinguish between groups of related documents, quickly ignore or focus on certain information, track recent evolutions of documents, as well as understand the historical relationships, heritage, and versions of these documents. This is all possible whether or not the document publishers specify where the content originally came from.

19 Claims, 4 Drawing Sheets

(56) References Cited

U.S. PATENT DOCUMENTS

| | | | |
|---|---|---|---|
| 6,230,155 | B1 | 5/2001 | Broder et al. |
| 6,240,409 | B1 | 5/2001 | Aiken |
| 6,249,769 | B1 | 6/2001 | Ruffin et al. |
| 6,260,141 | B1 | 7/2001 | Park et al. |
| 6,263,348 | B1 | 7/2001 | Kathrow et al. |
| 6,275,223 | B1 | 8/2001 | Hughes et al. |
| 6,282,698 | B1 | 8/2001 | Baker et al. |
| 6,285,999 | B1 | 9/2001 | Page |
| 6,330,670 | B1 | 12/2001 | England et al. |
| 6,381,698 | B1 | 4/2002 | Devanbu et al. |
| 6,393,438 | B1 | 5/2002 | Kathrow et al. |
| 6,397,205 | B1 | 5/2002 | Juola |
| 6,480,834 | B1 | 11/2002 | Engle et al. |
| 6,480,959 | B1 | 11/2002 | Granger et al. |
| 6,493,709 | B1 | 12/2002 | Aiken |
| 6,546,114 | B1 | 4/2003 | Venkatesan et al. |
| 6,557,105 | B1 | 4/2003 | Tardo et al. |
| 6,574,348 | B1 | 6/2003 | Venkatesan et al. |
| 6,615,209 | B1 | 9/2003 | Gomes et al. |
| 6,658,423 | B1 | 12/2003 | Pugh et al. |
| 6,658,626 | B1 | 12/2003 | Aiken |
| 6,735,490 | B2 | 5/2004 | Anand et al. |
| 6,862,696 | B1 | 3/2005 | Voas et al. |
| 6,928,419 | B2 | 8/2005 | Stefik et al. |
| 6,954,747 | B1 | 10/2005 | Wang et al. |
| 6,976,170 | B1 | 12/2005 | Kelly |
| 6,983,371 | B1 | 1/2006 | Hurtado et al. |
| 7,062,468 | B2 | 6/2006 | Hillegass et al. |
| 7,085,996 | B2 | 8/2006 | Hooks |
| 7,197,156 | B1 | 3/2007 | Levy |
| 7,228,427 | B2 | 6/2007 | Fransdonk |
| 7,254,587 | B2 | 8/2007 | Lee et al. |
| 7,343,297 | B2 | 3/2008 | Bergler et al. |
| 7,346,621 | B2 | 3/2008 | Zhang et al. |
| 7,346,839 | B2 | 3/2008 | Acharya et al. |
| 7,383,269 | B2 | 6/2008 | Swaminathan et al. |
| 7,483,860 | B2 | 1/2009 | Cronce et al. |
| 7,490,319 | B2 | 2/2009 | Blackwell et al. |
| 7,503,035 | B2 | 3/2009 | Zeidman |
| 7,552,093 | B2 | 6/2009 | Levin et al. |
| 7,568,109 | B2 | 7/2009 | Powell et al. |
| 7,627,613 | B1 | 12/2009 | Dulitz et al. |
| 7,676,465 | B2 | 3/2010 | Poola et al. |
| 7,680,773 | B1 * | 3/2010 | Acharya et al. ............... 707/737 |
| 7,681,045 | B2 | 3/2010 | Pedersen et al. |
| 7,707,157 | B1 | 4/2010 | Shen |
| 7,707,433 | B2 | 4/2010 | Rice et al. |
| 7,716,216 | B1 | 5/2010 | Harik et al. |
| 7,734,627 | B1 | 6/2010 | Tong |
| 7,757,097 | B2 | 7/2010 | Atallah et al. |
| 7,779,002 | B1 | 8/2010 | Gomes et al. |
| 7,783,976 | B2 | 8/2010 | Endo et al. |
| 7,797,245 | B2 | 9/2010 | Pedersen |
| 7,900,042 | B2 | 3/2011 | Hall et al. |
| 8,001,462 | B1 * | 8/2011 | Kupke et al. ................. 715/229 |
| 8,010,538 | B2 | 8/2011 | Pedersen |
| 8,010,803 | B2 | 8/2011 | Pedersen et al. |
| 2002/0138441 | A1 | 9/2002 | Lopatic |
| 2002/0138477 | A1 | 9/2002 | Keiser |
| 2002/0138764 | A1 | 9/2002 | Jacobs et al. |
| 2002/0188608 | A1 | 12/2002 | Nelson et al. |
| 2003/0126456 | A1 | 7/2003 | Birzer et al. |
| 2003/0164849 | A1 * | 9/2003 | Barrie et al. .................. 345/733 |
| 2004/0162827 | A1 | 8/2004 | Nakano |
| 2005/0015343 | A1 | 1/2005 | Nagai et al. |
| 2005/0060643 | A1 | 3/2005 | Glass et al. |
| 2005/0125358 | A1 | 6/2005 | Levin et al. |
| 2005/0165718 | A1 * | 7/2005 | Fontoura et al. .................. 707/1 |
| 2006/0015465 | A1 | 1/2006 | Kume et al. |
| 2006/0020571 | A1 * | 1/2006 | Patterson ......................... 707/1 |
| 2006/0122983 | A1 | 6/2006 | King et al. |
| 2006/0155975 | A1 | 7/2006 | Mueller |
| 2007/0157311 | A1 | 7/2007 | Meier et al. |
| 2007/0162890 | A1 | 7/2007 | Meier et al. |
| 2007/0174296 | A1 * | 7/2007 | Gibbs et al. ...................... 707/10 |
| 2007/0244915 | A1 * | 10/2007 | Cha et al. ...................... 707/101 |
| 2007/0299825 | A1 | 12/2007 | Rush et al. |
| 2008/0040316 | A1 | 2/2008 | Lawrence |
| 2008/0044016 | A1 | 2/2008 | Henzinger |
| 2008/0162478 | A1 | 7/2008 | Pugh et al. |
| 2008/0222142 | A1 * | 9/2008 | O'Donnell ...................... 707/5 |
| 2009/0043767 | A1 | 2/2009 | Joshi et al. |
| 2009/0171958 | A1 | 7/2009 | Anderson |
| 2010/0174686 | A1 * | 7/2010 | Acharya et al. ............... 707/690 |

OTHER PUBLICATIONS

Gansner et al., "A Technique for Drawing Directed Graphs", IEEE Transactions on Software Engineering archive vol. 19 Issue 3, Mar. 1993, pp. 214-230.

Hartig et al., "Publishing and Consuming Provenance Metadata on the Web of Linked Data", Proceedings of the 3rd International Provenance and Annotation Workshop (IPAW), Troy, New York, USA, Jun. 2010.

Hartig, "Provenance Information in the Web of Data", LDOW2009, Apr. 20, 2009, Madrid, Spain.

Hua et al., "Variable-Stride Multi-Pattern Matching for Scalable Deep Packet Inspection", Proceedings of IEEE INFOCOM 2009, pp. 415-423.

Kamps et al., "Best Match Querying form DocumentCentric XML" [online], Seventh International Workshop on the Web and Databases (WebDB 2004), Jun. 17-18, 2004, Paris, France [retrieved on Jun. 11, 2012], retrieved from the Internet <URL: http://webdb2004.cs.columbia.edu/papers/4-3.pdf>.

Karp et al., "Efficient randomized pattern-matching algorithms", IBM Journal of Research and Development vol. 31 Issue 2, Mar. 1987, pp. 249-260.

Kleinberg, "An Impossibility Theorem for Clustering", Advances in Neural Information Processing Systems 15, Proceedings of the 2002 Conference, pp. 446-453, MIT Press, Cambridge, Massachusetts, USA.

Kurland et al., "Respect My Authority! HITS Without Hyperlinks, Utilizing Cluster-Based Language Models", SIGIR '06: Proceedings of the 29th annual international ACM SIGIR conference on Research and development in information retrieval, Aug. 2006, Seattle, Washington, USA, pp. 83-90.

Lopresti, "Models and Algorithms for Duplicate Document Detection", Proceedings of the Fifth International Conference on Document Analysis and Recognition (ICDAR '99), Bangalore, India, pp. 297-300.

Manber, "Finding Similar Files in a Large File System", WTEC'94 Proceedings of the USENIX Winter 1994 Technical Conference, San Francisco, California, USA, pp. 1-10.

Manku et al., "Detecting NearDuplicates for Web Crawling" [online], WWW 2007, May 8-12, 2007, Banff, Alberta, Canada [retrieved on Jun. 11, 2012], retrieved from the Internet <URL: http://www2007.org/papers/paper215.pdf>.

Mens et al., "Software Evolution, Part I, Understanding and Analysing Software Evolution", Software Evolution, 2008, pp. 15-90, Springer.

Meziane et al., "A Document Management Methodology Based on Similarity Contents" Elsevier, 2003, Salford, United Kingdom, Information Sciences vol. 158 (2004), pp. 15-36.

Moussiades et al., "PDetect: a Clustering Approach for Detecting Plagiarism in Source Code Datasets", The Computer Journal vol. 48 No. 6, 2005, pp. 651-661.

Mozgovoy et al., "Fast Plagiarism Detection System", Proceedings of the International Symposium on String Processing and Information Retrieval (SPIRE2005), Buenos Aires, Argentina, Nov. 2005 (Lecture Notes in Computer Science), pp. 267-270.

Parapar et al., "Winnowing-Based Text Clustering", CIKM'08, Proceedings of the 17th ACM conference on Information and knowledge management, Oct. 26-30, 2008, Napa Valley, California, USA, pp. 1353-1354.

Paul et al., "A Framework for Source Code Search using Program Patterns", IEEE Transactions on Software Engineering, vol. 20, No. 6, Jun. 1994, pp. 463-475.

(56) References Cited

OTHER PUBLICATIONS

Pérez, "Provenance: From eScience to the Web of Data" [online], Presentation at Centre for Intelligent Information Technologies (CETINIA), Universidad Rey Juan Carlos, Madrid, Spain, Nov. 2009, [retrieved on Jun. 11, 2012], retrieved from the Internet <URL: http://www.cetinia.urjc.es/sites/default/files/userfiles/file/invited_lectures/Provenance_from%20eScience_to_Web_of_Data-17_11_09.pdf>.
"PB Code Analyzer Feature List" [online], Ecocion, Inc., 2010, [retrieved on Jun. 11, 2012], retrieved from the Internet <URL: http://www.ecocion.com/sites/default/files/PB%20Code/20Analyzer%20Feature%20List.pdf>.
Baeza-Yates et al., "A New Approach to Text Searching", Communications of the ACM 35, Oct 1992, pp. 74-82.
Bernstein et al., "Accurate discovery of co-derivative documents via duplicate text detection", Proceedings of the String Processing and Information Retrieval Symposium, Oct. 2004, Padua, Italy, pp. 55-67.
Bernstein et al., "Redundant Documents and Search Effectiveness", CIKM'05, Proceedings of the 14th ACM international conference on Information and knowledge management, Oct. 31-Nov. 5, 2005, Bremen, Germany, pp. 736-743.
Brin et al., "The Anatomy of a Large-Scale Hypertextual Web Search Engine", Seventh International World-Wide Web Conference (WWW 1998), Apr. 14-18, 1998, Brisbane, Australia.
Broder et al., "Syntactic Clustering of the Web" [online], SRC (Digital Systems Research Center) Technical Note #1997-015, Jul. 1997 [retrieved on Jun. 9, 2009], retrieved from the Internet <URL: http://citeseerx.ist.psu.edu/viewdoc/download?doi=10.1.1.83.3239&rep=rep1&type=pdf>.
Broder, "Algorithms for duplicate documents" [online], Presentation at Princeton University, Princeton, New Jersey, USA, Feb. 2005 [retrieved on Jan. 31, 2010], retrieved from the Internet <URL: http://www.cs.princeton.edu/courses/archive/spr05/cos598E/bib/Princeton.pdf>.
Broder, "On the resemblance and containment of documents", Compression and Complexity of Sequences '97, Sequences '97: Proceedings, Positano, Amalfitan Coast, Salerno, Italy, Jun. 11-13, 1997, pp. 21-29.
Burkhard et al., "Some Approaches to Best-Match File Searching", Communications of the ACM, Apr. 1973, vol. 16, No. 4, pp. 230-236.
Chang et al., "Theoretical and Empirical Comparisons of Approximate String Matching Algorithms" [online], University of California, Berkeley EECS Technical Reports [retrieved on Oct. 10, 2010], retrieved from the Internet <URL: http://www.eecs.berkeley.edu/Pubs/TechRpts/1991/CSD-91-653.pdf>.
Chen et al., "Efficient String Matching Algorithms for Combinatorial Universal Denoising", Proceedings of the 2005 Data Compression Conference (DCC'05), Snowbird, Utah, 2005, pp. 153-162.
Clifford, et al., "A Fast, Randomised, Maximal Subset Matching Algorithm for Document-Level Music retrieval," SOFSEM '07 Proceedings of the 33rd conference on Current Trends in Theory and Practice of Computer Science, copyright 2006 University of Victoria.
Clough, "Plagiarism in natural and programming languages: an overview of current tools and technologies" [online], Jul. 2000 [retrieved on Jun. 11, 2012], retrieved from the Internet <URL: http://ir.shef.ac.uk/cloughie/papers/plagiarism2000.pdf>.
Cohen, "Recursive Hashing Functions for n-Grams", ACM Transactions on Information Systems, vol. 15, No. 3, Jul. 1997, pp. 291-320.

Cole et al., "Verifying Candidate Matches in Sparse and Wildcard Matching" [online], STOC 02, May 19-21, 2002, Montreal, Quebec, Canada [retrieved on Jun. 11, 2012], retrieved from the Internet <URL: http://hariharan-ramesh.com/papers/dontcares.pdf>.
Damashek, "Gauging Similarity with n-Grams: Language-Independent Categorization of Text", Science, New Series, vol. 267, No. 5199, Feb. 10, 1995, pp. 843-848.
Eastlake et al., "US Secure Hash Algorithm 1 (SHA 1)" [online], The Internet Engineering Task Force (IETF), Network Working Group, Request for Comments: 3174, Sep. 2001 [retrieved on Jun. 11, 2012], retrieved from the Internet <URL: http://tools.ietf.org/pdf/rfc3760>, pp. 1-22.
Farringdon, "Analysing for Authorship: A Guide to the Cusum Technique" [online], Introduction document originally on http://members.aol.com/qsums/QsumIntroduction.html [retrieved on Jun. 11, 2012], retrieved via Internet Archive from the Internet <URL: http://web.archive.org/web/20041013020613/http://members.aol.com/qsums/QsumIntroduction.html>.
Prechelt et al., "Finding plagiarisms among a set of programs with JPlag", Resubmission to J. of Universal Computer Science, Nov. 28, 2001, pp. 1-23.
Rabin, "Fingerprinting by Random Polynomials" [online], Center for Research in Computing Technology Harvard University Report TR-15-81, 1981 [retrieved on Oct. 10, 2010], retrieved from the Internet <URL: http://www.xmailserver.org/rabin.pdf>.
Schleimer et al., "Winnowing: Local Algorithms for Document Fingerprinting", Proceedings of the 2003 ACM SIGMOD International Conference on Management of Data 2003, pp. 76-85.
Seo et al., "Local Text Reuse Detection", Proceedings of the 31st annual international ACM SIGIR conference on Research and development in information retrieval (SIGIR '08), pp. 571-578.
Shivakumar et al., "Finding near-replicas of documents on the web", International Workshop on the Web and Databases (WebDB 1998), Mar. 27-28, 1998, Valencia, Spain.
Shixia et al., "An LOD Model for Graph Visualization and its Application in Web Navigation", Proceedings of the 7th Asia-Pacific web conference on Web Technologies Research and Development (APWeb'05), pp. 441-452.
Si et al., "Check: A Document Plagiarism Detection System", Symposium on Applied Computing, Proceedings of the 1997 ACM symposium on Applied computing, 1997, pp. 70-77.
Sutinen et al., "On Using q-Gram Locations in Approximate String Matching", Proceedings of the Third Annual European Symposium on Algorithms (ESA '95), pp. 327-340, Springer-Verlag, London, United Kingdom.
"The Quest for an Open Source Genome" [online], Black Duck Software, Inc., 2007 [retrieved on Feb. 23, 2010], retrieved from the Internet <URL: http://www.wetzelconsultingllc.com/Open-Source-Genome.pdf>.
Whale, "Identification of Program Similarity in Large Populations", The Computer Journal, vol. 33, No. 2, 1990, pp. 140-146.
Wise et al., "YAP3: Improved Detection of Similarities in Computer Program and Other Texts," SIGCSEB'96: SIGCSE Bulletin (ACM Special Interest Group on Computer Science Education), pp. 130-134.
Zeng et al., "Learning to Cluster Web Search Results" [online], Presentation 2004 [retrieved on Sep. 6, 2009], retrieved from the Internet <URL: http://klpl.re.pusan.ac.kr/seminar/2004/winter/%EC%84%B8%EB%AF%B8%EP%82%98%5B1%5D.ppt>.

* cited by examiner

REGION BASED INFORMATION RETRIEVAL SYSTEM

CROSS-REFERENCE TO RELATED APPLICATIONS

This utility patent application claims priority from U.S. provisional patent application Ser. No. 61/318,272, filed Mar. 26, 2010, titled "REGION BASED INFORMATION RETRIEVAL SYSTEM" in the name of Palle M. Pedersen, which is hereby fully incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2011, Palle M. Pedersen.

TECHNICAL FIELD

This invention relates to information retrieval systems, including search engines and organization of large document collections.

BACKGROUND

Information retrieval systems are used to find relevant information from large data sets. Universities and public libraries use information retrieval systems to provide access to books, journals and other documents, whereas large enterprises use information retrieval systems to provide internal access to their large collections of internal documents. Web search engines (e.g. Google) are the most visible information retrieval systems. A typical implementation of an information retrieval system might include 1) a document collection subsystem, 2) an indexing subsystem, and 3) a searching and ranking subsystem.

A typical document collection subsystem (e.g. a web crawler) takes a list of document references (e.g. URLs) and retrieves documents from the locations indicated in these document references. After retrieval, the documents along with the corresponding document reference are passed onto the indexing subsystem. The documents are also parsed and any document references found within the documents are extracted. These document references are then added to the lists which the document collection subsystem uses for retrieving further documents.

A typical indexing subsystem takes the documents with their corresponding document references and uses this to create and update a searchable index, where all the associations between the documents and individual words and other data are stored in such a way as to enable efficient lookups. The documents or the words are often ranked in order to determine which documents are the most relevant to a given word.

A typical searching and ranking subsystem uses the search information (e.g. keywords typed into a Google search box) to look up in the searchable index, and retrieves and ranks the set of document references from here. Sometimes the actual documents or extracts of the documents are also part of the results.

Current state-of-the-art information retrieval systems typically focus on ranking the results retrieved by the searching and ranking subsystem using a combination of ranking information stored in the searchable index and through use of algorithms. These algorithms typically use information such as use of search terms in document names and URLs, location of search terms in documents, and popularity of documents (e.g. Google Page Rank) to determine which results are most appropriate.

BRIEF SUMMARY OF THE INVENTION

A region based information retrieval system improves on conventional information retrieval systems by breaking down documents into one or more region(s) and processing the additional information available at a region level of analysis. When looking at regions, it becomes possible to quickly distinguish between groups of related documents, quickly ignore or focus on certain information, track recent evolutions of documents, as well as understand the historical relationships, heritage, and versions of these documents. This is all possible whether or not the document publishers specify where the content originally came from.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Operation

A region based information retrieval system improves on conventional information retrieval systems by breaking down documents into one or more region(s) and processing the additional information available at a region level of analysis. When looking at regions, it becomes possible to quickly distinguish between groups of related documents, quickly ignore or focus on certain information, track recent evolutions of documents, as well as understand the historical relationships, heritage, and versions of these documents. This is all possible whether or not the document publishers specify where the content originally came from.

The portion of a document that is considered to be a region may be determined by separations found in the document structure, encoding or formatting, and/or by identifying regions that have duplicates or near-duplicates within the same document or in other documents. Note that regions can fully or partially contain other regions—even in the same documents—and that each complete document can itself be considered a region. Examples of regions in a text document include a phrase, a sentence, a paragraph, a set of paragraphs.

Examples of regions in a video include a segment, a dialogue, a scene, or any other part of the video.

Region sets are sets of duplicate or near-duplicate regions in multiple documents, as well as the sets of any unique regions. A data structure that describes a region set would contain representations of the content in the regions and an indication of the locations of all the related regions within the documents.

A simple example of a region set includes a case where two paragraphs of specific text are present in three different documents. The two paragraphs would be considered a region in each of the documents, and the region set would contain some representation of the two paragraphs and references to where the regions would exist in each of the three documents.

In addition, data structures describing documents, regions, and region sets can contain additional meta information about the related documents, regions, or region sets, which includes information such as content types, sizes, languages, URLs, timestamps, as well as information like how closely the related regions match.

The relationship between region sets can be characterized as 1) enclosed overlap relationships, where the content of one region set (the subset region set) is the subset of the content of another region set (the superset region set), 2) non-enclosed overlap relationships, where some content exist in both region sets, while both region sets also have content which are not in the other region set, 3) other relationships, where other information, such as the presence of an explicit reference (e.g. URL to a document containing a region set), can be used to establish a relationship between region sets, and 4) no relationship for region sets which have no direct relationship.

Region set relationships are used to establish region set graphs, which are directed graphs of region sets based on the relationships between region sets. In addition, any related meta information can be used to determine strength of and type of these relationships, as well as help with any clustering of the graphs.

A simple example of a region set graph include a case where a region set (region set A) represents three paragraphs of specific text which is present in two different documents and where another region set (region set B) represents two of these paragraphs in five different documents (include the previously mentioned two documents). In this case region set B would be considered in an enclosed overlap relationship with region set A and region set B would be a subset of region set A. This relationship would be represented in the region set graph.

Using this division of documents into regions, and the organization of regions into corresponding regions sets, a region-based information retrieval system can create a searchable index of region sets for efficiently finding the most appropriate region sets which have regions related to particular search terms.

Methodologies currently used to create a searchable index of documents can be used to create a searchable index of region sets. In addition, the region set graphs can be used to optimize the searchable index for efficient region set retrieval.

When region based information retrieval systems receive a request for information, a searching and ranking subsystem first identifies any matching region sets using the searchable index, and then organizes the region sets into region set clusters of closely related region sets based on the relationships in the region set graphs. The importance of all or some of the region sets in each region set cluster can then be used to determine the importance of each region set cluster.

Methodologies currently used to establish the importance of a single document in search results can be used to establish the importance of a region set. In addition, the aggregate information about all documents containing a region in a region set can help determine the importance of the related region set or any region set closely related in the region set graph.

After the importance of region set cluster is determined, the searching and ranking subsystem creates a list of region set clusters. This list can be ranked according to importance of the regions set clusters or any other sorting criteria.

This resulting list of region set clusters can be used in a number of different ways, which can be done separately or in combination.

For example, one use of the list of region set clusters is to directly display the list of region sets clusters. Selected data from each region set cluster—along with data from related region sets and documents—can be shown in order to help an end-user determine the relevance of that particular region set cluster. The selection of which data or data samples to show can be based on many factors, including importance of a region set, position of a region set graphs, timestamps (newest, oldest), and other meta information by itself or in aggregate.

Given that each region set cluster typically represents several region sets, each entry in the list of region set clusters (or a related document reference in a list) can optionally be expanded in order to show detailed information. This information can include a list of the related region sets and the related documents within a region set cluster. This information can be organized by relationship, time, importance, subsearch, etc.

An alternative way to organize the search results is to construct a list of document references for documents which contain samples of each region set cluster. In the case where document references are used to show the search results, additional clustering could be performed in order to organize region set clusters from the same documents or from the same origin into single clusters.

Yet another use of the results is to establish the lineage of the region sets or documents in each region set cluster. This includes identifying the ends of the graph (e.g. The oldest or newest documents) in each region set cluster. Such results can be combined with meta information and other known information about originality of regions or documents in order to more precisely determine answers about the lineage of information and to questions like "where did this specific content go?" And "where did this specific content come from?".

Whether the actual region set clusters or any associated document references are used, any methodology currently used for displaying search results can be used along or instead of the mentioned search result display.

Example of Adding Documents

Figure 1:
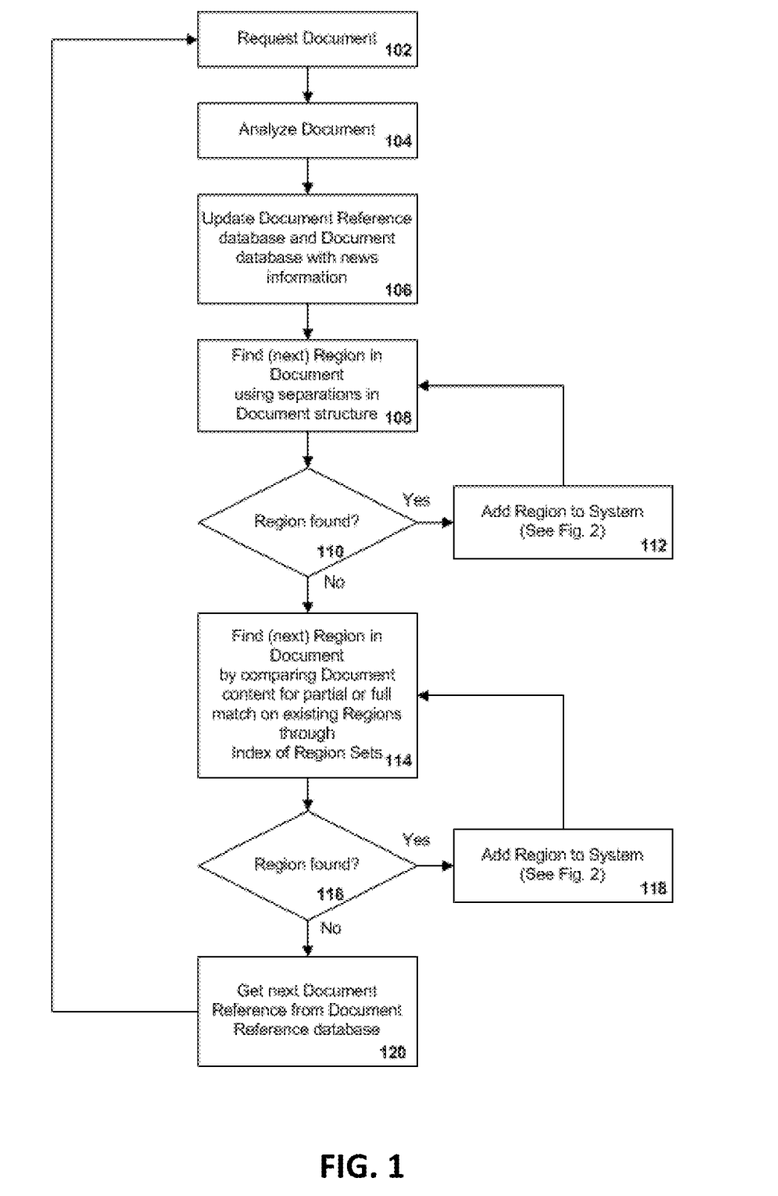
FIG. 1 is a flowchart illustrating an example of an implementation adding documents to a region based information retrieval system.

FIG. 1 shows an example of an implementation adding documents to a region based information retrieval system. In this example, the document collection subsystem first retrieves a document 102 based on a document reference. Then 106 it updates the document database with the content of the document and the results of the document analysis 104, after which it updates the document reference database with the retrieval status and any other document references found in the document.

Using the document's content and meta information, the system finds a set of regions using separations in the document structure and adds these regions to the system (108, 110, and 112). The details of adding a region to the system can be handled by the indexing subsystem as explained using FIG. 2 below.

Next, the system finds another set of regions by comparing the content of the document to the content of the regions (114, 116, and 118) using the index of region set database. This process will identify regions which have full or partial duplicates as well as full or partial near-duplicates in the existing region set database. As in the previous example above, the details of adding a region to the system can be done as described using FIG. 2 below.

The system continues by getting either a new document reference from the document reference database, or by getting a document reference for a document that should be revisited by the document collection subsystem 120.

Example of Adding a Region to the Index

Figure 2:
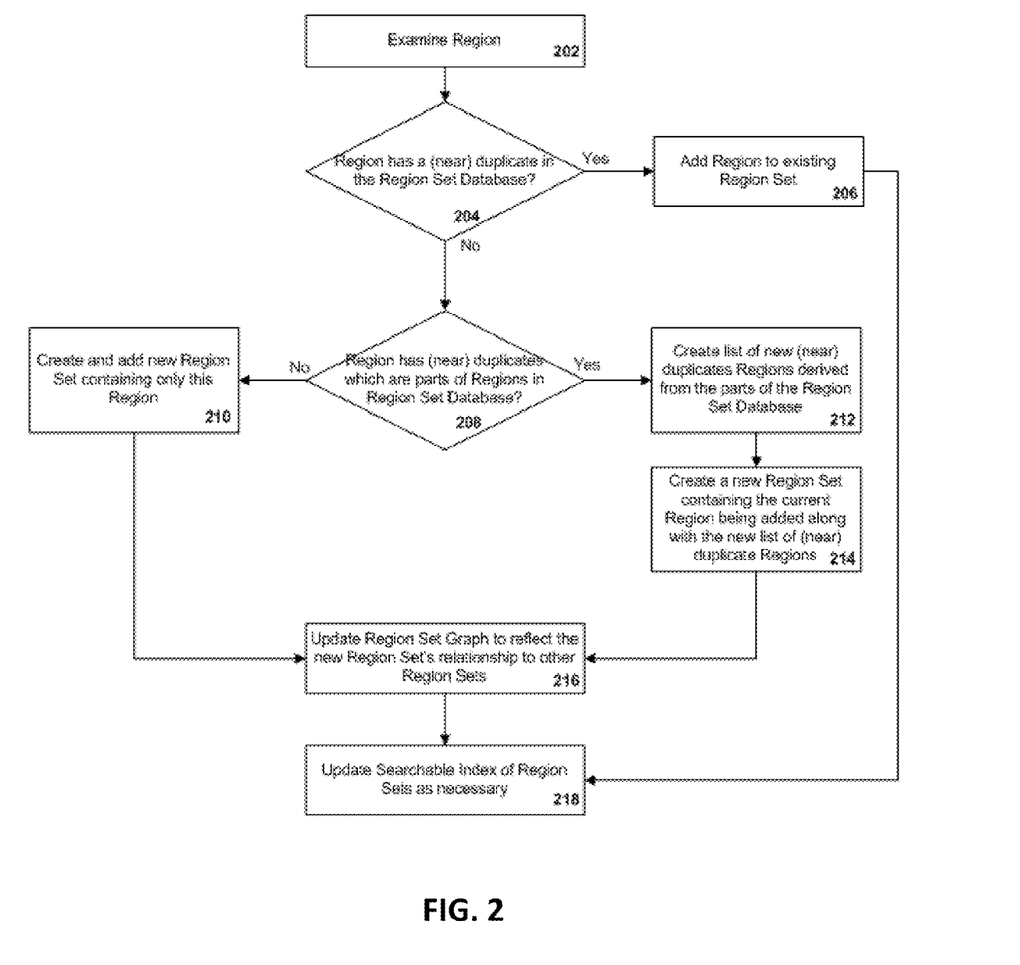
FIG. 2 is a flowchart illustrating an example of an implementation adding a region (identified above) to a region based information retrieval system.

FIG. 2 shows an example of an implementation adding a region (identified above) to a region based information retrieval system. In this example, the region is first examined for any matches in the region set database 202. In the case where the identification of a region is done as described in FIG. 1, this information may already be available from the region identification step 114.

If the region has a full duplicate or full near-duplicate in an existing region set 204, then the region is simply added to the region set 206.

If the region has partial duplicate(s) or partial near-duplicate(s) in one or more existing region sets 208. In that case a new region set is created 214 using the region currently examined, as well as a list of full duplicate or full near-duplicate regions established by taken the matching portions of the regions in the otherwise partially matching region sets 212.

If the region has neither a full duplicate, a full near-duplicate 204, a partial duplicate, nor a partial near-duplicate 208 in the existing region set, then the region is unique, and a new region set is created with only this region in it 210.

Note that no matter how a region is added to a region set, the relationship with the associated document is also recorded.

After a new region set has been created, the region set graph database is updated to incorporate any new relationships with the other region sets 216.

The final step is to update the searchable index of region set database based on the information just added to the other databases 218.

Example of Information Retrieval

Figure 3:
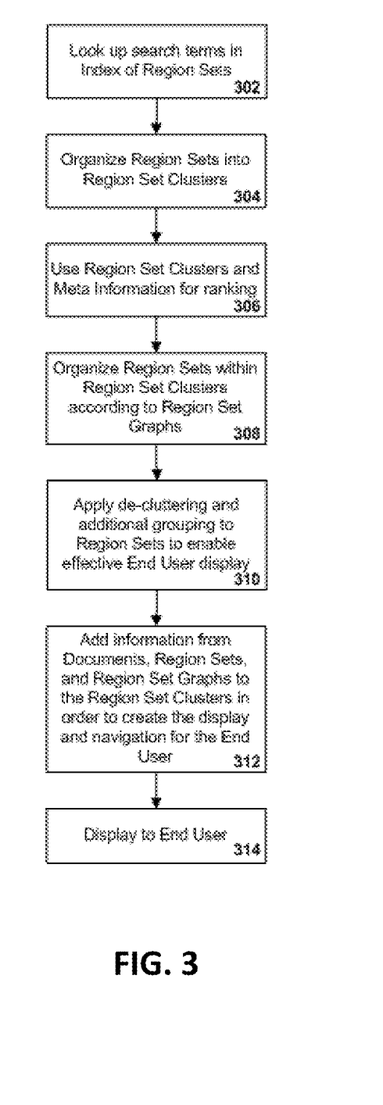
FIG. 3 is a flowchart illustrating an example of an implementation retrieving information from a region based information retrieval system.

FIG. 3 shows an example of an implementation retrieving information from a region based information retrieval system. In this example, search terms are looked up in the index of region sets 302 to find matching region sets. The resulting region sets are organized into region set clusters based on the relationships between the region sets as indicated by the region set graphs 304.

The information in the region set clusters, the related region sets, the related region set graphs, and the related documents is used to rank the clusters according to expected relevance to the end user 306.

The region sets within each region set cluster is then organized using meta information and the relationships in the region set graph 308 in order to be able to illustrate the relationships between the results.

Within each region set cluster, additional filtering, de-cluttering and grouping of the region sets is performed in order to show the most relevant results first 310.

Information from the related documents (e.g. sample content, timestamp), region sets (e.g. # of document matches), and region set graphs (e.g. 10 region sets with 35 documents appear older) are added to the result set 312 before displaying the results to an end user 314.

In a large scale implementation of this system, it is expected that some of these tasks (e.g. 302, 304, 306, 308, and 310) are done in parallel on a partial result set and the results are then combined to create a final result.

Other examples could use a similar approach to find documents with similarities to a current document or to establish lineage of documents.

Example System

Figure 4:
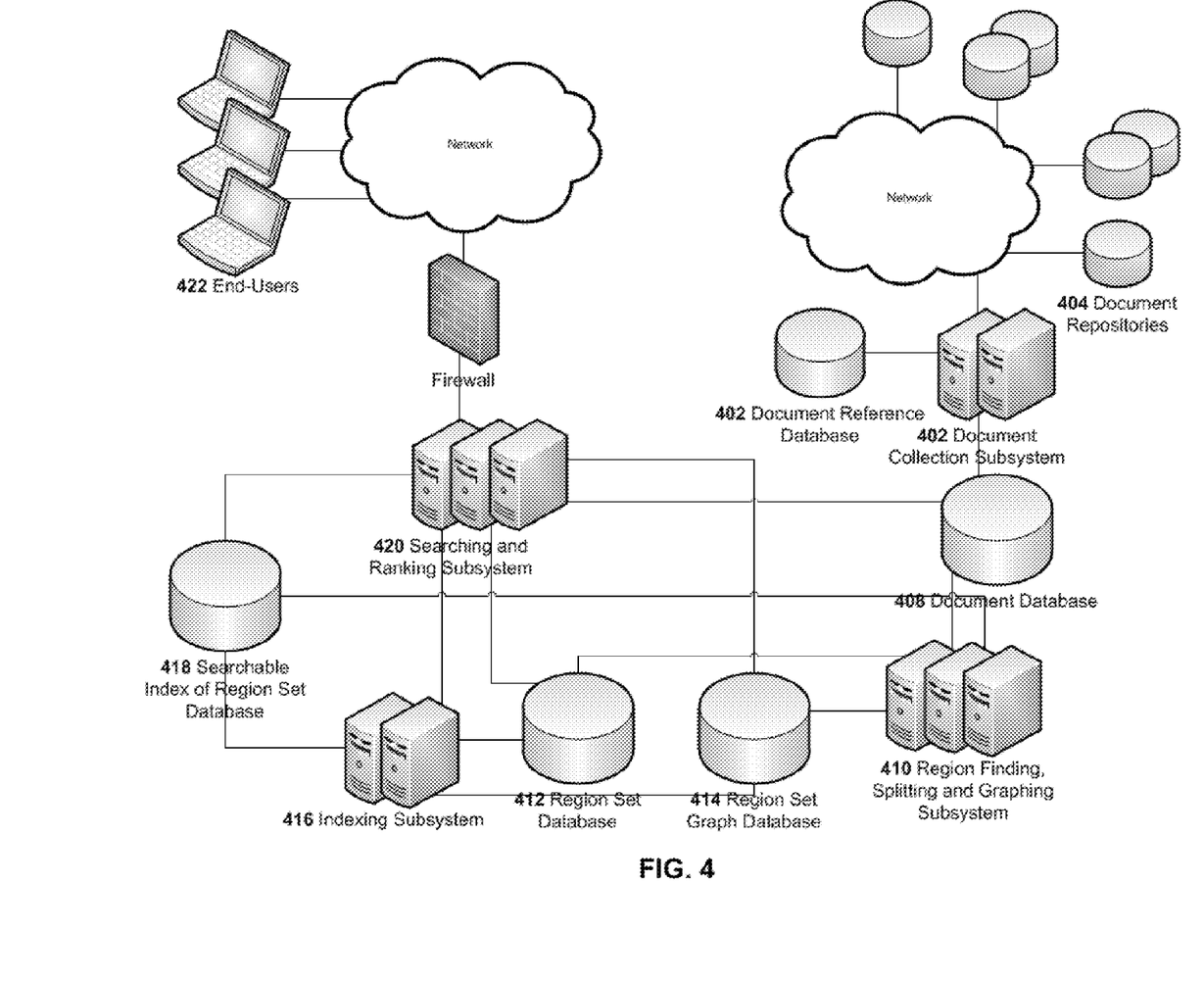
FIG. 4 is a system diagram of an example of an implementation of a region based information retrieval system.

FIG. 4 illustrates an example of an implementation of a region based information retrieval system. In this implementation, the document collection subsystem 402 uses the document references in the document reference database 404 to determine which documents to collect. They then collect the documents from document repositories 406 and store the documents with all related meta information in the document database 408. The document reference database 404 is continuously updated based on any additional information in newly collected documents or their meta information. In addition the document reference database 404 can be updated from external sources.

The region finding, splitting and graphing subsystem 410 creates and maintain the region set database 412 and region set graph database 414. In order to do this, documents from the document database 408 are analyzed, regions identified, the region set database 412 is updated with the new regions and their meta information, and the region set graph database 414 is updated with the relationships between the updated region sets and other regions sets.

The indexing subsystem 416 creates and maintains the searchable index of region sets database 418 based on the region set database 412 and the region set graph database 414. The searchable region index facilitates fast searching for content in the region sets.

The searching and ranking subsystem 420 performs the actual searching for content using the searchable index of region sets database 418, and then combines the relevant information from the region set database 412 and the region set graph database 414 in order to present the end-users 422 with any requested search results.

Other Embodiments

As will be apparent to those skilled in the art, many aspects of the disclosure may be implemented in various differing fashion while still functioning with a region based information retrieval system.

Although this implementation is described with certain part of the processing done by the indexing subsystem and other parts by the searching and ranking subsystem, alternative implementations of the system could be implemented with either performing more of the processing by the indexing subsystem and less by the searching and ranking subsystem, or by performing more of the processing by the searching and ranking subsystem and less by the indexing subsystem.

Another implementation could use sets of words, phrases, or non-contiguous regions as an alternative to contiguous regions described above.

Another implementation could establish additional regions based on the relationship between regions and between regions and the respective documents. This includes additional regions which consist of one or more existing regions present in the same document.

Another implementation could use time-information from documents, such as creation time, modification time, or time information in the document data, in order to establish a time-based order to the graph of region sets.

Another implementation could extend region set clusters to include additional region sets with no query matches, as long as they have relevant relationships to matching region sets in the region set graph.

Another implementation could extend region sets to include groups of region sets where either the same or related documents contain the regions in the region set—the documents could be related by e.g. Coming from the same source.

Another implementation could interpret translations of data to indicate a duplicate or near-duplicate.

Another implementation could interpret rewording, rephrasing, recompilation, or other identifiable transformations of data to indicate a duplicate or near-duplicate.

Another implementation could apply to documents which are partially or fully binaries, pictures, videos, other digital media, or combinations thereof. An example could be where a picture embedded in one document is a near-duplicate of a second picture after cropping has been applied to the second picture.

Another implementation could include uncompressing, decrypting, or otherwise unpacking documents into one or more documents before the processing is applied.

Another implementation could send search keywords or keywords within retrieved documents to an alternative information retrieval system (e.g. Yahoo or Google) to obtain an additional list of document references to feed the document collection subsystem. This would enhance the completeness of the results.

Another implementation could add additional information of relationships to the graph of region sets, e.g. A subset region appears to be a summary, a subset region appears to be a quote, a URL reference appears to be a backlink, a superset region appears to be an aggregated list.

Another implementation could fully or partially flatten the graph of region sets based on the collection of documents to facilitate quick search results.

Another implementation presents the search results using an interactive graph instead of a list.

Each subsystem and database could be implemented in various ways, including using mobile devices, single CPUs, single servers, distributed server-farms, or computing clouds—such as the Amazon Elastic Compute Cloud (Amazon EC2) or the Google App Engine.

Each database could be implemented in various ways, including using SQL database(s), NoSQL database(s), file system(s), distributed storage, RAID system(s), disk(s), tape, flash device(s).

Another implementation could split up one or more of the databases into multiple databases or combine the databases into fewer databases.

Another implementation could split up one or more of the subsystems into multiple subsystems or combine the subsystems into fewer subsystems.

Another implementation of the region finding, splitting and graphing subsystem could be organize the data less, and leave some processing (e.g. region set organization and graphing) to the searching and ranking subsystem—e.g. compute the relevant region set graphs for the region sets after search is done.

What is claimed is:

1. A system for retrieving information from document collections comprising:
    a document collection subsystem for managing documents in a document database;
    a region finding, splitting and graphing subsystem for analyzing documents in the document database, establishing regions of these documents, where the region is less than the containing document and the bounds of each region is defined by the existence of at least one other identical or nearly identical region elsewhere in the document database, identifying region sets of such identical or nearly identical regions across documents, and storing these regions sets in a region set database;
    an indexing subsystem for making the region sets searchable and storing the index information in a searchable index of region set database; and
    a searching and ranking subsystem for finding region sets in the region set database using the searchable index of region sets based on an information request, creating a list of region set clusters of closely related region sets from the regions sets found, where the relations are based on the relationships in the region set graphs obtained from the region set graphs database, and communicating the search results.

2. The system of claim 1, wherein the region finding, splitting and graphing subsystem further establishes region set graphs with relationships between the region sets, and stores these region set graphs in a region set graph database.

3. The system of claim 1, wherein the searching and ranking subsystem further creates a list of documents from the document database which contains regions belonging to the region sets found and communicates these results.

4. The system of claim 1, wherein the results contain the regions sets within each regions set cluster.

5. The system of claim 4, wherein the regions sets within each regions set cluster are ranked based on the chronology of the region sets.

6. The system of claim 1, wherein the results contain the documents from the document database which contains regions belonging to the region sets found.

7. The system of claim 1, wherein the information request comprises a search text.

8. The system of claim 1, wherein the information request comprises similarity to a document, image, video, or other content.

9. The system of claim 1, wherein the relationship between region sets comprises content of the regions in one region set being a subset of content of regions in another region set.

10. The system of claim 1, wherein the relationship between region sets comprises content of the regions in one region set partially overlapping with content of regions in another region set.

11. A method of organizing and retrieving information in documents collections comprising:
    a document collection element for managing documents in a document database;
    a region finding, splitting and graphing element for analyzing documents in the document database, establishing regions of these documents, where the region is less than the containing document and the bounds of each region is defined by the existence of at least one other identical or nearly identical region elsewhere in the document database, identifying region sets of such identical or nearly identical regions across documents, and storing these regions sets in a region set database;
    an indexing element for making the region sets searchable and storing the index information in a searchable index of region set database; and
    a searching and ranking element for finding region sets in the region set database using the searchable index of region sets based on an information request, creating a list of region set clusters of closely related region sets from the regions sets found, where the relations are based on the relationships in the region set graphs obtained from the region set graphs database, and communicating the search results.

12. The method of claim 11,
wherein the region finding, splitting and graphing element further establishes region set graphs with relationships between the region sets, and stores these region set graphs in a region set graph database.

13. The method of claim 11, wherein the relationship between these region sets are either one region set being a partial or full subset of the other region set or one region set containing a reference to or keywords of a document containing all or part of the other region set.

14. The method of claim 11, wherein an attempt is made to establish the strength of the relationship between the region sets.

15. The method of claim 11, wherein an attempt is made to establish the chronology of the region sets within region set clusters.

16. The method of claim 11, wherein the search results are ranked based on the relationships between the region sets.

17. The method of claim 11, wherein the search results are the documents partially or fully containing the identified sets of regions.

18. The method of claim 11, wherein the relationship between region sets comprises content of the regions in one region set partially overlapping with content of the regions in another region set.

19. The method of claim 11, wherein an attempt is made to establish the chronology of the documents within region set clusters.

* * * * *